W. A. PITT.
TRAPS FOR SEWER-PIPES.
No. 171,849.  Patented Jan. 4, 1876.
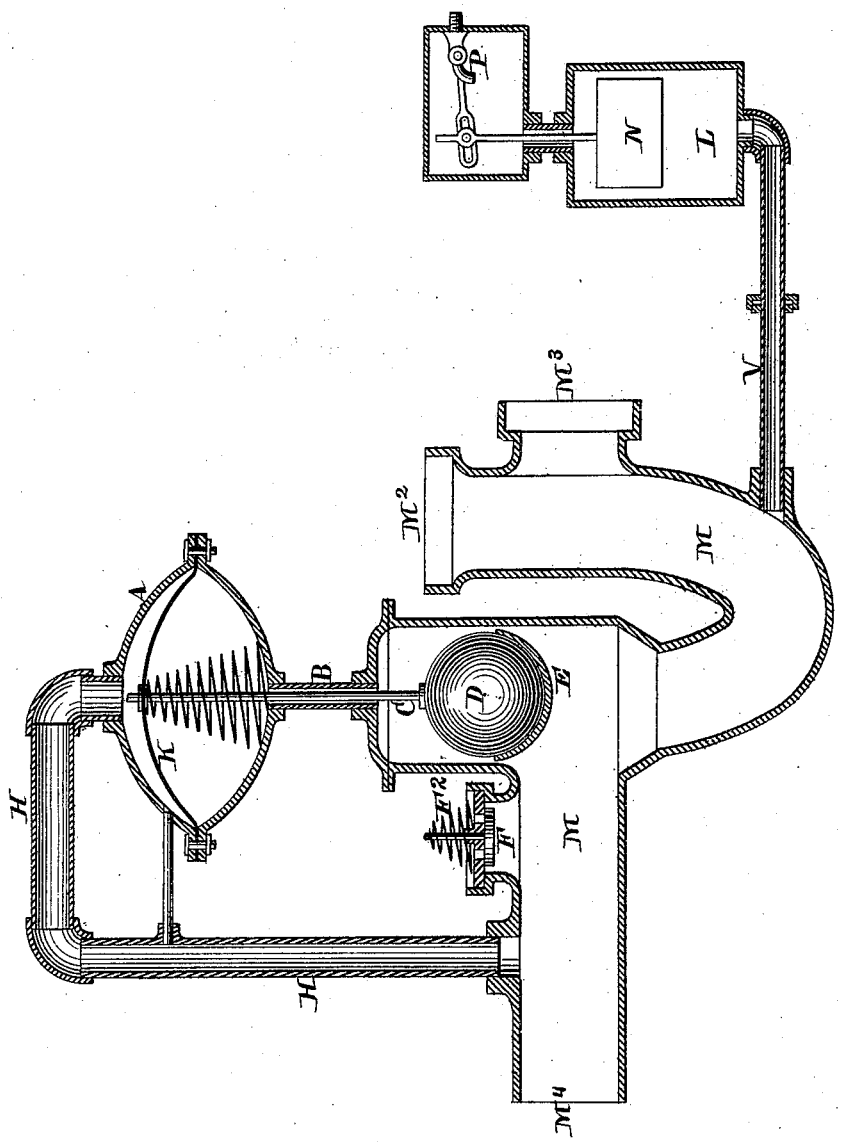
Witnesses.
Otto Hufeland.
Chas. Wahlers.
Inventor.
William A. Pitt
by VanSantvoord & Hauff
his attys.

UNITED STATES PATENT OFFICE.

WILLIAM A. PITT, OF NEW YORK, N. Y.

IMPROVEMENT IN TRAPS FOR SEWER-PIPES.

Specification forming part of Letters Patent No. 171,849, dated January 4, 1876; application filed December 1, 1875.

*To all whom it may concern:*

Be it known that I, WILLIAM A. PITT, of the city, county, and State of New York, have invented a new and Improved Trap for Sewer-Pipes, which invention is fully set forth in the following specification, reference being had to the accompanying drawing, which represents a longitudinal vertical section.

This invention relates to sewer-traps; and consists of certain improvements, which will be fully hereinafter described, and specifically pointed out in the claims, a preliminary description being therefore deemed unnecessary.

In the drawing, the letter M designates my trap, which is, by preference, made of cast-iron, and which is provided with several openings, $M^2$, $M^3$, and $M^4$. The opening $M^2$ serves for getting to the inside and bottom of the trap M, for the removal of dirt or impurities which may lodge therein. The opening $M^3$ serves for the house-connection, and the opening $M^4$ for the connection of the discharge-pipe. From the bottom part of the trap M extends a pipe, V, to a chamber, L, which is closed air-tight, and which contains a float, N, that connects with the key of a faucet, P, which leads into the chamber L, and which connects with a water-supply pipe. When the water in the siphon of the trap sinks below the desired level from evaporation or otherwise, the faucet P is opened, and a sufficient quantity of water is admitted to restore the desired level in the trap. With the trap M is connected a lentil-shaped chamber, A, by means of a tube, B, said chamber being constructed of two parts, between which is secured an elastic diaphragm, K. From this diaphragm is suspended a rod, C, to the bottom end of which is secured a valve, D, which may be of any suitable shape, and which, by preference, is provided with a face, E, of rubber or other equivalent material. A weak spring retains said valve in the position shown. The upper part of the chamber A connects, by a pipe, H, with the discharge-branch of the trap, and if said trap is exposed to an external pressure, which would be liable to drive the liquid out of its siphon, the diaphragm K is depressed, and the valve D closes the communication between the discharge-branch and the siphon of the trap. In the discharge-branch of my trap is placed a valve, F, which opens inward, being closed against its seat by a weak spring, $F^2$.

If the trap is exposed to a suction, which would be liable to empty the siphon of the trap, the valve F is opened before the liquid from the siphon discharges, and by the entrance of air from the outside the power of the suction is destroyed.

By this arrangement a trap is obtained the siphon of which will always be properly filled with liquid. If the liquid evaporates a new supply will enter from the chamber L, and, in case of a pressure from the outside, the liquid in the siphon is protected by the valve D, while, in case of a suction, the liquid is prevented from discharging by the valve E.

With the opening $M^2$ may be combined a pipe containing a check-valve, opening upward and leading into a flue, or into the outer end of the sewer, for the purpose of relieving the trap from any undue pressure.

What I claim as new, and desire to secure by Letters Patent, is—

1. In combination with a sewer-trap, the valve D, rod C, and spring, the diaphragm K in chamber A, and the pipe H, connecting the said chamber with the discharge-branch of the trap, the whole arranged to operate substantially as described.

2. In combination with a sewer-trap, the pipe V, chamber L, float N, and cock P of the water-supply pipe, the whole arranged to operate substantially as described.

In testimony that I claim the foregoing I have hereunto set my hand and seal.

WILLIAM A. PITT. [L. S.]

Witnesses:
 E. F. KASTENHUBER,
 ROBT. E. MILLER.